United States Patent
Nakai et al.

(10) Patent No.: US 7,438,657 B2
(45) Date of Patent: Oct. 21, 2008

(54) BICYCLE FRONT DERAILLEUR

(75) Inventors: Etsuo Nakai, Sakai (JP); Nobuyoshi Fujii, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/298,705

(22) Filed: Dec. 12, 2005

(65) Prior Publication Data

US 2007/0298920 A1    Dec. 27, 2007

(30) Foreign Application Priority Data

May 27, 2005    (JP) .............................. 2005-156069

(51) Int. Cl.
*F16H 61/00* (2006.01)
*B62M 9/12* (2006.01)

(52) U.S. Cl. ....................................................... 474/80

(58) Field of Classification Search ............ 474/78–82; 285/15, 112, 373, 367, 379; 248/274, 315, 248/540

See application file for complete search history.

(56) References Cited

U.S. PATENT DOCUMENTS

| | | | | | |
|---|---|---|---|---|---|
| 3,730,012 | A | * | 5/1973 | Juy | 474/82 |
| 4,362,522 | A | * | 12/1982 | Huret | 474/82 |
| 4,479,787 | A | * | 10/1984 | Bonnard | 474/82 |
| 5,037,355 | A | * | 8/1991 | Kobayashi | 474/82 |
| 5,620,384 | A | * | 4/1997 | Kojima et al. | 474/82 |
| 5,624,336 | A | * | 4/1997 | Kojima | 474/82 |
| 6,099,425 | A | * | 8/2000 | Kondo | 474/82 |
| 6,234,927 | B1 | * | 5/2001 | Peng | 474/82 |
| 6,270,124 | B1 | * | 8/2001 | Nanko | 285/15 |
| 6,629,903 | B1 | * | 10/2003 | Kondo | 474/82 |
| 6,641,495 | B2 | * | 11/2003 | Valle | 474/80 |
| 6,923,740 | B2 | * | 8/2005 | Nanko | 474/82 |
| 6,962,544 | B2 | * | 11/2005 | Nanko | 474/80 |
| 7,186,194 | B2 | * | 3/2007 | Nankou | 474/80 |
| 2003/0100393 | A1 | | 5/2003 | Nanko | |
| 2004/0157690 | A1 | | 8/2004 | Nankou | |

FOREIGN PATENT DOCUMENTS

JP       2003-160087 A     6/2003

* cited by examiner

*Primary Examiner*—Marcus Charles
(74) *Attorney, Agent, or Firm*—Global IP Counselors, LLP

(57) ABSTRACT

A bicycle front derailleur includes a fixing member, a chain guide and a linkage mechanism. The fixing member includes axially aligned first and second attachment flanges. The linkage mechanism couples the chain guide to the fixing member for movement between a retracted position and an extended position. The linkage mechanism includes a first link, a second link, a first pivot pin and a second pivot pin. The second link is rotatably coupled to the first and second attachment flanges. The first pivot pin rotatably couples the second link to the first attachment flange, and the second pivot pin rotatably couples the second link to the second attachment flange. One of the first and second pivot pins is retained in place at both ends, and the other is retained at one end only.

25 Claims, 13 Drawing Sheets

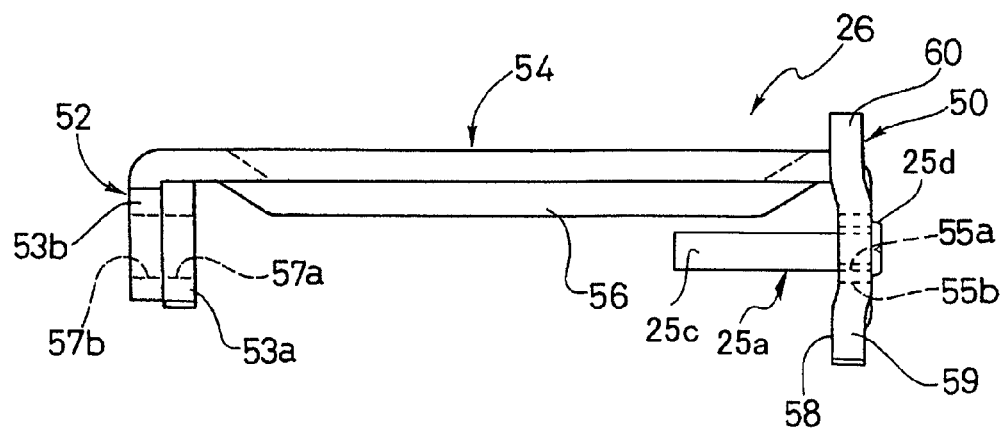
Fig. 13
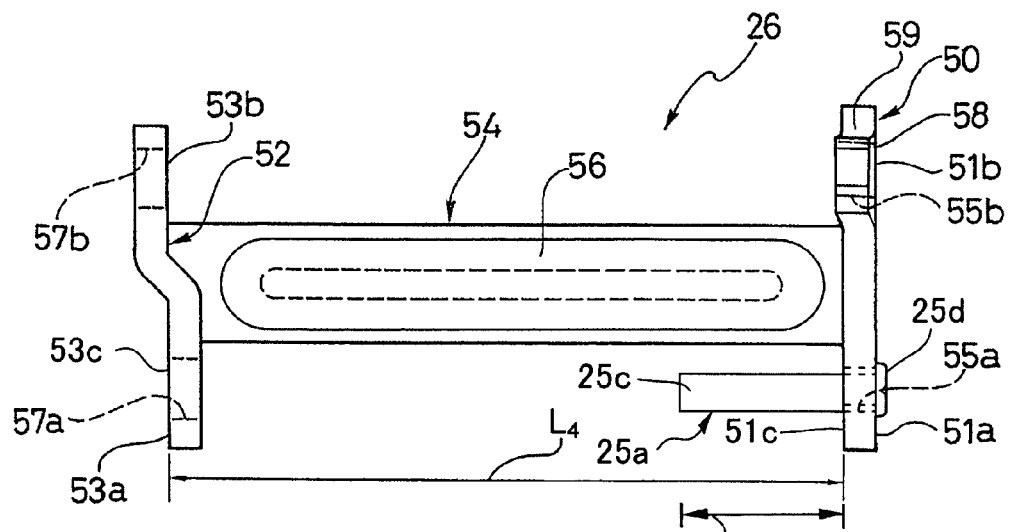
Fig. 14
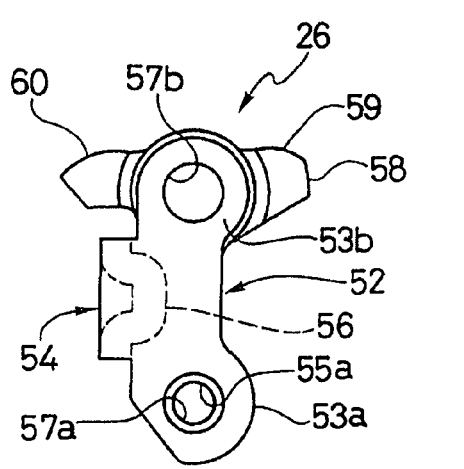 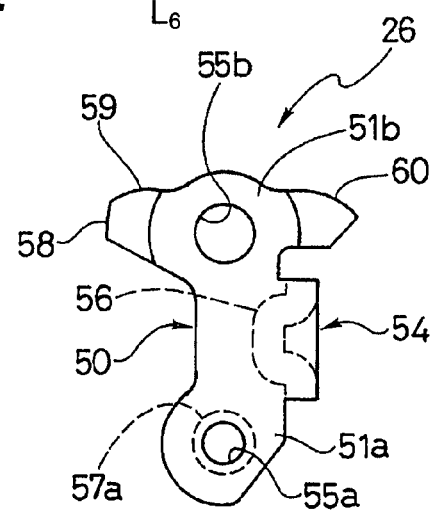
Fig. 15    Fig. 16

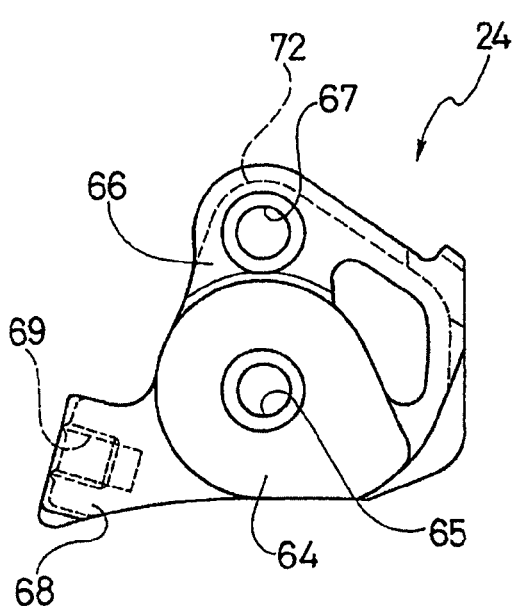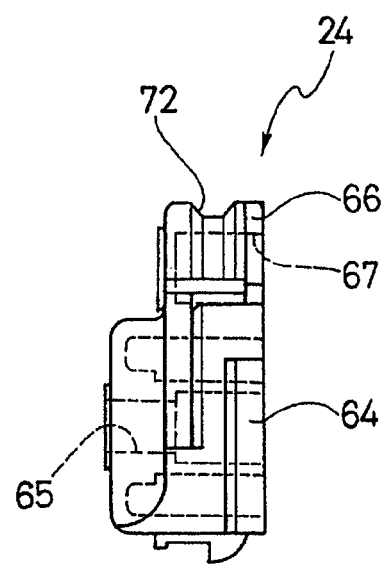
Fig. 17    Fig. 18
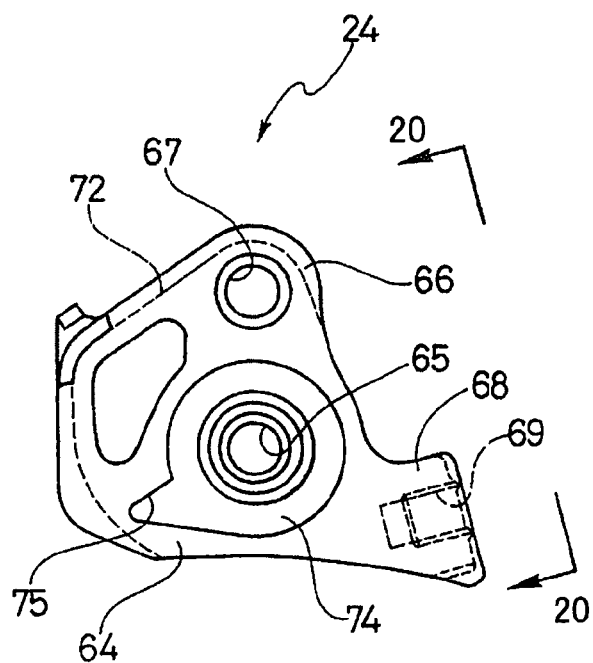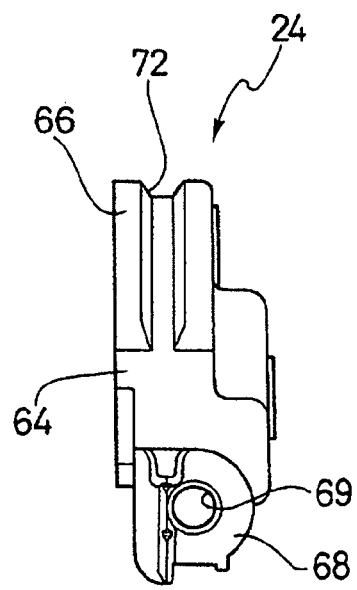
Fig. 19    Fig. 20

BICYCLE FRONT DERAILLEUR

CROSS-REFERENCE TO RELATED APPLICATIONS

This application claims priority under 35 U.S.C. § 119 to Japanese Patent Application No. 2005-156069. The entire disclosure of Japanese Patent Application No. 2005-156069 is hereby incorporated herein by reference.

BACKGROUND OF THE INVENTION

1. Field of the Invention

The present invention generally relates to a bicycle front derailleur. More specifically, the present invention relates to a bicycle front derailleur attachable to a bicycle frame that includes a chain guide movable between a retracted position and an extended position.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively and continuously redesigned over a long period of time is the front derailleur. Front derailleurs are generally attached to the bicycle frame adjacent to the front chain rings or chain ring set.

In general, front derailleurs are equipped with a fixing member that attaches to the bicycle frame, a linkage mechanism and a chain guide movably coupled to the fixing member by the linkage mechanism, where the linkage mechanism is configured to move the chain guide between an extended position and a retracted position relative to the front chain rings (for example, see to Japanese Laid-Open Patent Application No. 2003-160087).

Conventional linkage mechanisms typically include a first link, a second link, and a third link. The fixing member includes axially aligned and spaced apart first and second attachment flanges. A gap is formed between the first and second attachment flanges. The first link is rotatably coupled to the fixing member at a first rotation point such that rotation of the first link occurs about a first rotational axis. The second link is rotatably supported by the first and second attachment flanges such that rotation occurs about a second rotational axis that is substantially parallel to the first rotational axis. The third link is rotatably coupled to the chain guide and is movably linked to the first and second link to form a four-member linkage mechanism that includes the fixing member. The second link is rotatably supported on to the first and second attachment flanges by a first pivot pin and a second pivot pin that extend into holes in respective ones of the first and second linking flanges. The first and second pivot pins are flanged pins that have a flange or head at one end thereof and are retained in place by a locking ring that is installed at respective distal ends of the first and second pivot pins.

When assembling the linkage mechanism of the front derailleur, the first and second pivot pins are mounted on the first and second attachment flanges from outward sides of the fixing member with the second link disposed adjacent to the first and second attachment flanges. Locking rings are installed on respective distal ends of the first and second pivot pins to retain them in position. When the locking rings are mounted on the distal ends of the first and second pivot pins, the overall number of assembly steps required for the front derailleur is large because both first and second locking pins require a groove to receive the locking rings, and the second link must be held in position as the first and second pivot pins are installed. It is therefore desirable to decrease the number of assembly steps to increase manufacturing productivity.

In view of the above, it will be apparent to those skilled in the art from this disclosure that there exists a need for an improved front derailleur linkage mechanism design that makes it possible to reduce the number of assembly steps. This invention addresses this need in the art as well as other needs, which will become apparent to those skilled in the art from this disclosure.

SUMMARY OF THE INVENTION

It has been discovered that in order to reduce the number of assembly steps required to produce a front derailleur, pivot pins can be reconfigured with fewer attachment portions thereby eliminating manufacturing steps.

One object of the present invention is to reduce the number of manufacturing steps necessary to assemble a front derailleur of a bicycle.

Another object of the present invention is to simplify the installation of pivot pins in the linkage mechanism of a front derailleur.

In accordance with one aspect of the present invention, a bicycle front derailleur includes a fixing member, a chain guide and a linkage mechanism. The fixing member is configured to be attached to a bicycle frame and includes a first attachment flange and a second attachment flange axially aligned with one another. The second attachment flange is spaced apart in an axial direction from the first attachment flange. The chain guide is coupled to the fixing member for movement between a retracted position and an extended position in a transverse direction relative to fixing member and the bicycle frame. The linkage mechanism couples the chain guide to the fixing member for movement of the chain guide between the retracted position and the extended position. The linkage mechanism includes a first link, a second link, a third link, a first pivot pin and a second pivot pin. The first link is pivotally coupled to the fixing member for rotation about a first rotational axis. The second link is also pivotally coupled to the first and second attachment flanges such that rotation occurs about a second rotational axis that is substantially parallel to the first rotational axis. The third link is pivotally coupled to both the first and second links forming a four-member linkage mechanism along with the fixing member for movement of the chain guide. The first pivot pin has a first end fixed to the second link to substantially prevent axial movement relative to the second link, and a second end free of any mechanical retaining connection with the first attachment flange that prevents axial movement relative to the first attachment flange.

In accordance with the first aspect of the present invention, when the fixing member is attached to the bicycle frame, the chain guide changes the position of a bicycle chain via the linkage mechanism. When the second link is installed on the first and second attachment flanges of the fixing member, the first pivot pin is retained against axial movement at just one end. In the prior art when one end of the pivot pin includes a head and is mounted in advance on the second link, the pivot pin is retained at its other end with the locking ring. Manufacturing of such a pivot pin requires a groove to retain the locking ring. Manufacturing costs are higher and additional assembling steps are required. Further, in other prior art configurations where one end of the pivot pin includes a head and the other end is fixed in place by flaring or deforming, the pivot pin must be installed on the second link, and the distal end flared and fixed in place. By the present invention, the first pivot pin is fixed to the second link in advance. In this condition, the first pivot pin is easily installed to the first attachment flange, and the second pivot pin is more easily attached to the second attachment flange. When retaining occurs via a locking ring as in the prior art, the locking rings are mounted on the distal end of the pivot pins which must be held in place. Further, when retaining is accomplished by flaring and fixing the pivot pins in place, the other ends of each pivot pin must likewise be held in place during the flaring and fixing in place. With the present invention, the first pivot pin is mechanically retained at just one end, and the first pivot pin can be fixed in advance to the second link. For this reason, if one of pivot pins if fixed to the second link in advance at one end only, then the number of assembly steps can be reduced, and the assembly operation for the second link is facilitated.

In accordance with a second aspect of the present invention, the first pivot pin is retained by flaring and fixing in place. In this case, retaining is accomplished by flaring and fixing in place, groove work for a locking ring is unnecessary.

In accordance with a third aspect of the present invention, at least one end of the second pivot pin is retained by a locking ring in the derailleur. Hence, a flaring tool for flaring and fixing the second pivot pin in place is unnecessary. Additionally, maintenance is facilitated because the second pivot pin is removable.

In accordance with a fourth aspect of the present invention, the first and second attachment flanges of the fixing member have different lengths in the direction of the second rotational axis. Accordingly, the distance that spans the outer sides of the first and second attachment flanges is increased compared to the prior art, and the second link is provided with broader support and therefore resists creaking or making related noises, even when forces are applied from the chain guide to the second link.

In accordance with a fifth aspect of the present invention, the first link includes a shifter cable latching portion that receives a gear shift cable that is coupled to a gear shifter for positioning the chain guide. Accordingly, the chain guide can be moved by the gear shift cable coupled to the gear shifter and is connected to the cable latching portion.

In accordance with another aspect of the present invention, the first attachment flange is formed with a hole that receives the first pivot pin, the hole being longer than the first pivot pin. Accordingly, the first pivot pin is rotatably retained in the hole but has a free end without a mechanical fastening connection that restricts axial movement. Consequently, the derailleur is more easily assembled and manufacturing costs are reduced.

In accordance with yet another aspect of the present invention, the linkage mechanism of the derailleur includes an urging member for biases the chain guide towards either the retracted position or the extended position. In this case, because the chain guide is moved in one direction by the urging member, the chain guide can be moved back and forth from the extended position to the retracted position by pulling movement in the direction opposite to the urging direction by a shift cable.

In accordance with still another aspect of the present invention, a method for assembling a bicycle front derailleur includes the following steps: providing a fixing member with spaced apart first and second attachment portions with first and second holes that are coaxially aligned arranged; providing a link having spaced apart first and second attachment flanges with a first pivot pin fixed at a first end to the first attachment flange; inserting the first pivot pin into the first hole of the second attachment portion of the fixing member such that the link is supported on the fixing member by the first pivot pin; and securing a second pivot pin between the second attachment flange of the link and the second hole of the second attachment portion of the fixing member while leaving a second end of the first pivot pin free of any mechanical retaining connection with the first attachment flange that prevents axial movement relative to the first attachment flange.

Accordingly, with the method for assembling a bicycle front derailleur, the first pivot pin is fixed to the second link member prior to installation on the fixing member. The first pivot pin allows for easy assembly of the second link member to the fixing member and the second pivot pin is then easily installed to the second link member and fixing member. In this case, the first pivot pin is fixed in advance to the second link member, and thus when the second link member is installed on the fixing member, the second pivot pin only needs to be mechanically retained. For this reason, the number of assembly steps can be reduced, and assembly of the front derailleur is easily facilitated.

In accordance with still yet another aspect of the present invention, the securing of the second pivot pin between the second attachment flange of the link and the second hole of the second attachment portion of the fixing member includes deforming one end of the second pivot pin. Accordingly, with the above method for assembling a bicycle front derailleur, one end of the second pivot pin is retained by flaring and fixing in place. Therefore, manufacturing steps for machining a locking ring retaining groove are unnecessary.

With the front derailleur of the present invention, where only one end of one of the first and second pivot pins retained at one end only, assembly steps are reduced and the manufacturing process simplified.

With the link assembly for a bicycle front derailleur according to the present invention, the first pivot pin is fixed in advance to the second linking member, and so the second linking member need only be retained when the linking member is linked to the fixing member. For this reason, the number of assembly steps can be reduced and assembly of the linking member is facilitated.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 13 is a top plan view of the support link of the front derailleur removed from the front derailleur in accordance with the first embodiment of the present invention;

FIG. 14 is an inboard side elevational view of the support link removed from the front derailleur in accordance with the first embodiment of the present invention;

FIG. 15 is a front elevational view of the support link removed from the front derailleur in accordance with the first embodiment of the present invention;

FIG. 16 is a rear elevational view of the support link removed from the front derailleur in accordance with the first embodiment of the present invention;

FIG. 17 is a rear elevational view of the front derailleur cable mounting link removed from the front derailleur in accordance with the first embodiment of the present invention;

FIG. 18 is an outboard side elevational view of the cable mounting link removed from the front derailleur in accordance with the first embodiment of the present invention;

FIG. 19 is a front elevational view of the cable mounting link removed from the front derailleur in accordance with the first embodiment of the present invention;

FIG. 20 is an inboard side elevational view of the cable mounting link removed from the front derailleur viewed along the line 20-20 in FIG. 19 in accordance with the first embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
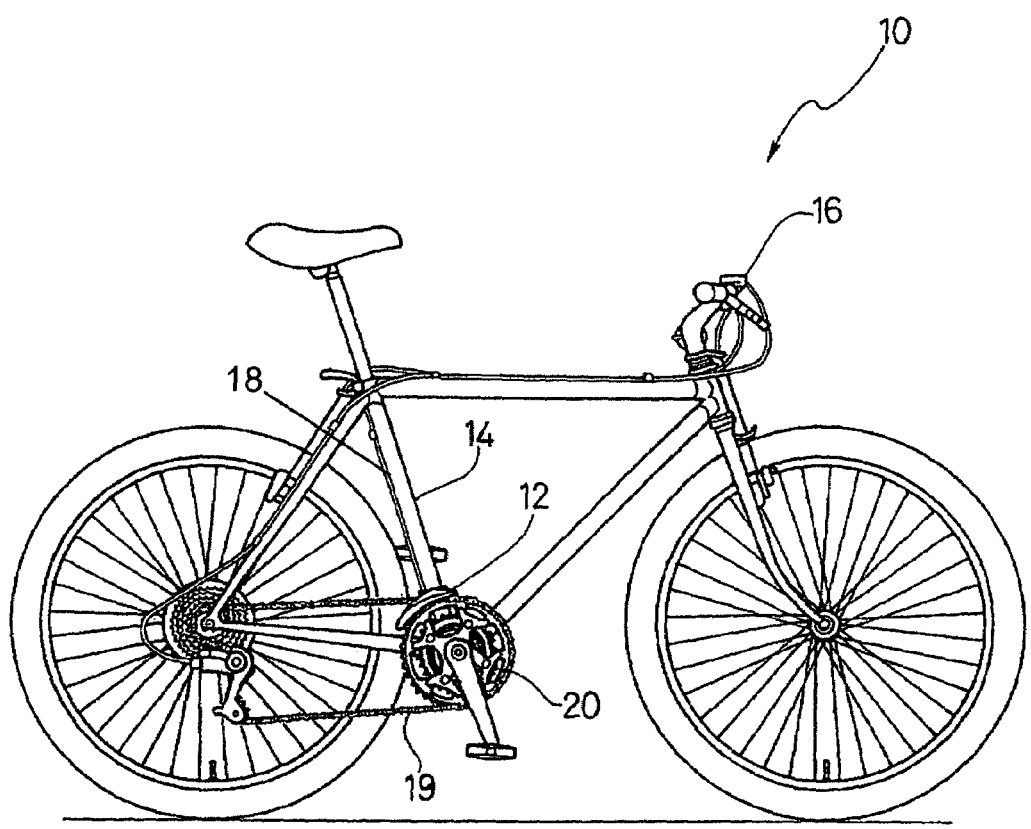
FIG. 1 is a side elevational view showing a bicycle having a bicycle frame that includes a seat tube, with a front derailleur attached to the seat tube in accordance with a first embodiment of the present invention.

Referring initially to FIG. 1, a bicycle 10 includes a font derailleur 12 that is mounted on a seat post 14 of the frame of the bicycle 10. The front derailleur 12 is operated via a gear shift cable 18 using a gear shifter 16, to guide movement of the chain 19 between multiple chain rings of a chain ring assembly 20.

Figure 2:
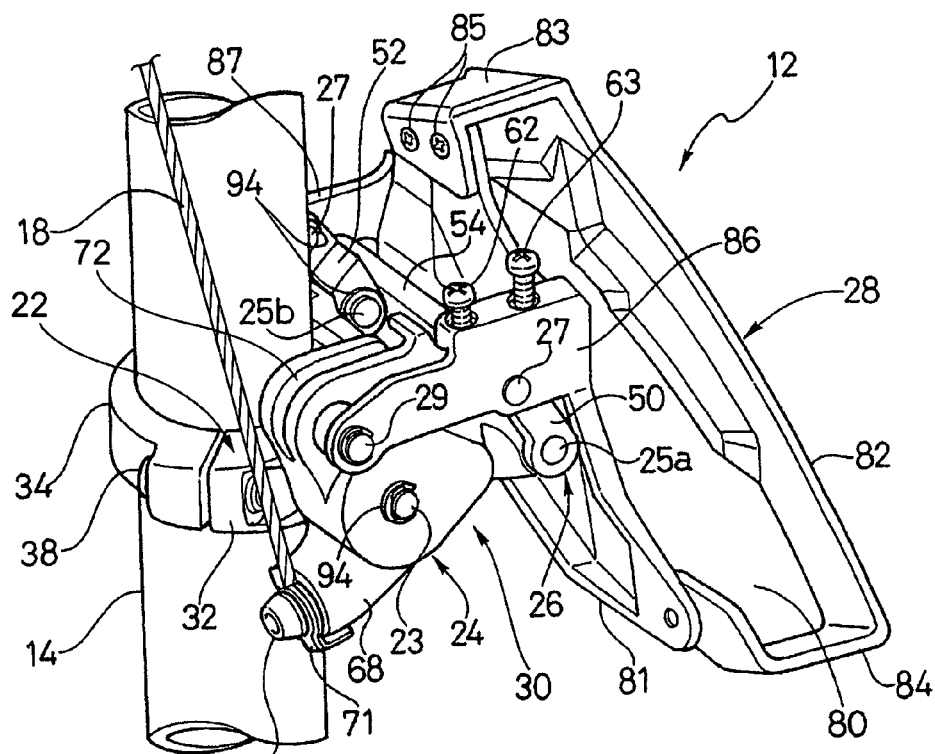
FIG. 2 is an enlarged rear perspective view of the front derailleur depicted in FIG. 1, shown attached to the seat tube of the bicycle frame of the bicycle with a control cable extending upward from the front derailleur and further extending upward along the seat tube of the bicycle frame in accordance with the first embodiment of the present invention.
Figure 3:
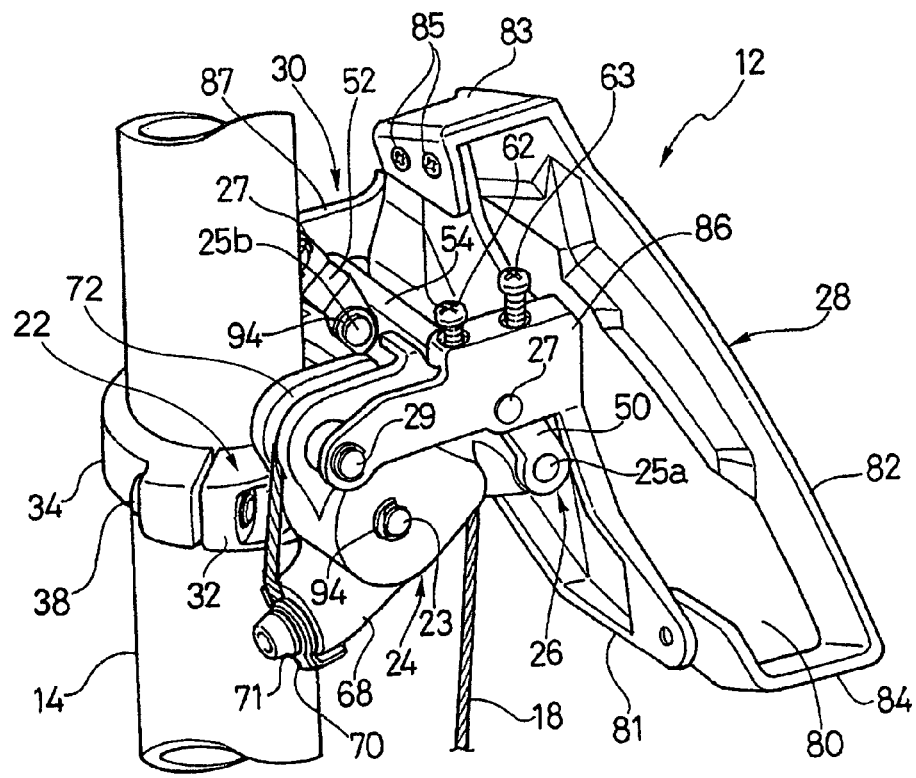
FIG. 3 is an enlarged rear perspective view, similar to FIG. 2, of the front derailleur attached to the seat tube of the bicycle frame of the bicycle with a control cable extending downward from the front derailleur in accordance with the first embodiment of the present invention.
Figure 4:
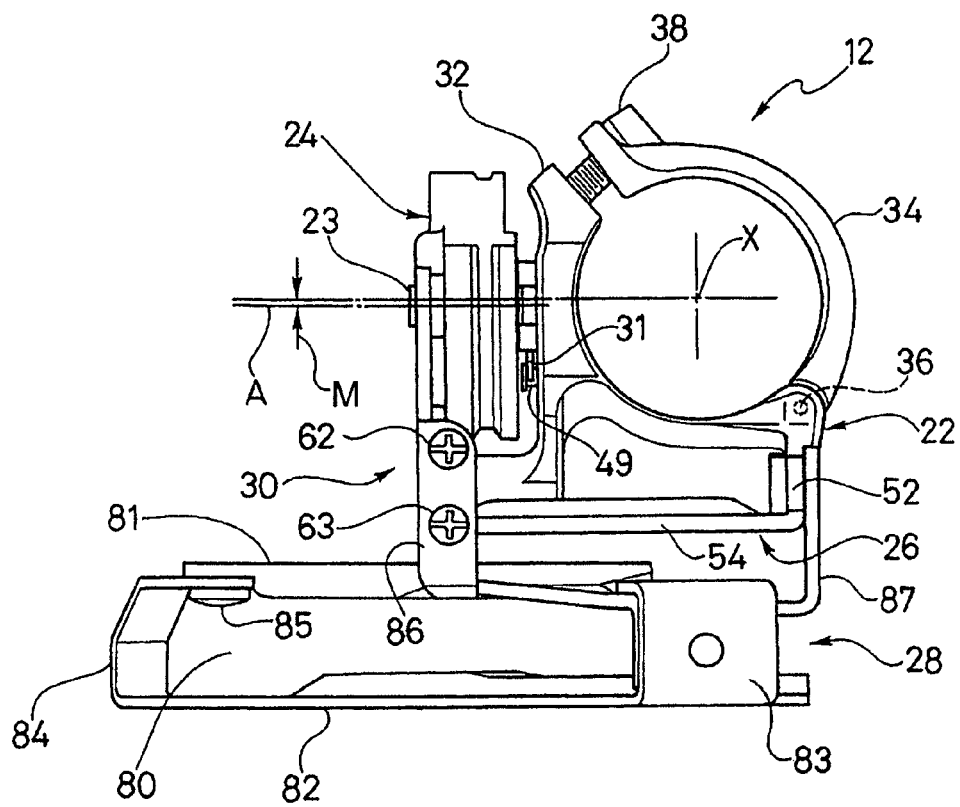
FIG. 4 is a top plan view of the front derailleur detached from the seat tube of the bicycle frame in accordance with the first embodiment of the present invention.
Figure 5:
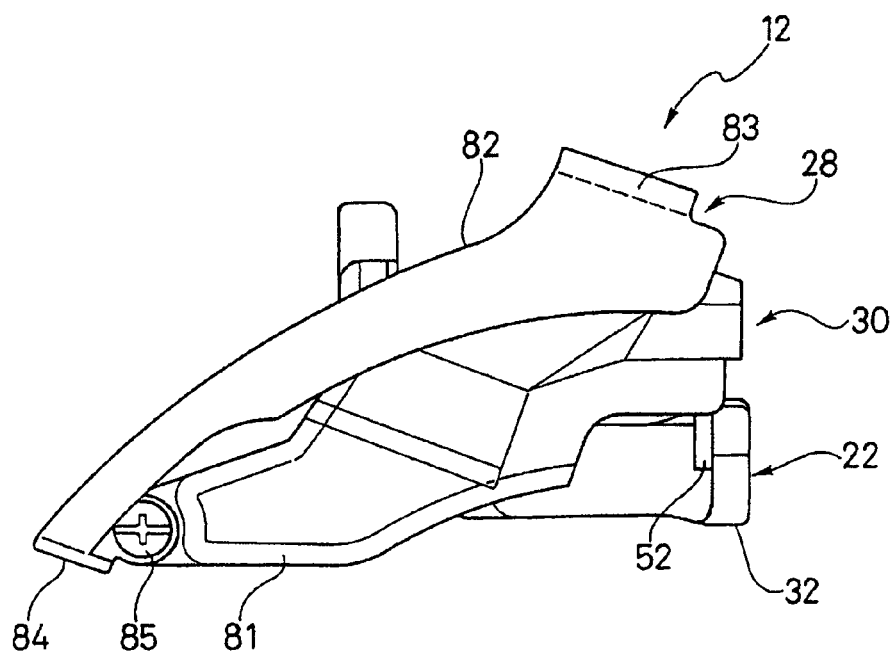
FIG. 5 is an outboard side elevational view showing the front derailleur depicted in FIG. 4 in accordance with the first embodiment of the present invention.

With specific reference to FIGS. 2 to 8, the front derailleur 12 of the present invention basically includes a fixing member 22 (FIGS. 2, 3, 4, 6 and 7), a cable mounting link 24 (FIGS. 2, 3, 4, 6 and 7), a pair of rotational pins 25a and 25b, a wide support link 26 (FIGS. 2, 3, 4, 6 and 7), a pair of pivot pins 27 and a chain guide 28. The fixing member 22 is preferably a tubular clamp member or device that includes a flange or support protrusion that includes a curved or arcuate portion that has a central axis X, as shown in FIG. 4 and described in greater detail below. The chain guide 28 is movably supported on the fixing member 22 by the cable mounting link 24 and the support link 26, as described further below. Specifically, the chain guide 28 moves between a retracted position and an extended position (respective shift positions) corresponding to the locations of chain rings of the chain ring assembly 20.

The cable mounting link 24 rotates about a first rotational axis A (shown in FIGS. 4, 6 and 7) that is approximately perpendicular and spaced apart from the center axis X of the fixing member 22. The respective parts of the fixing member 22, the cable mounting link 24, the support link 26, and the chain guide 28 form a comparatively wide linkage mechanism 30. Due to the location of the first rotational axis A of the cable mounting link 24, and the wide design of the linkage mechanism 30, smooth and highly reliable shifting of the chain 19 between the various chain rings of the chain ring assembly 20 is facilitated. Further, it should be appreciated that the first rotational axis A extends through the seat post 14 with the front derailleur 12 installed on the seat post 14.

Figure 6:
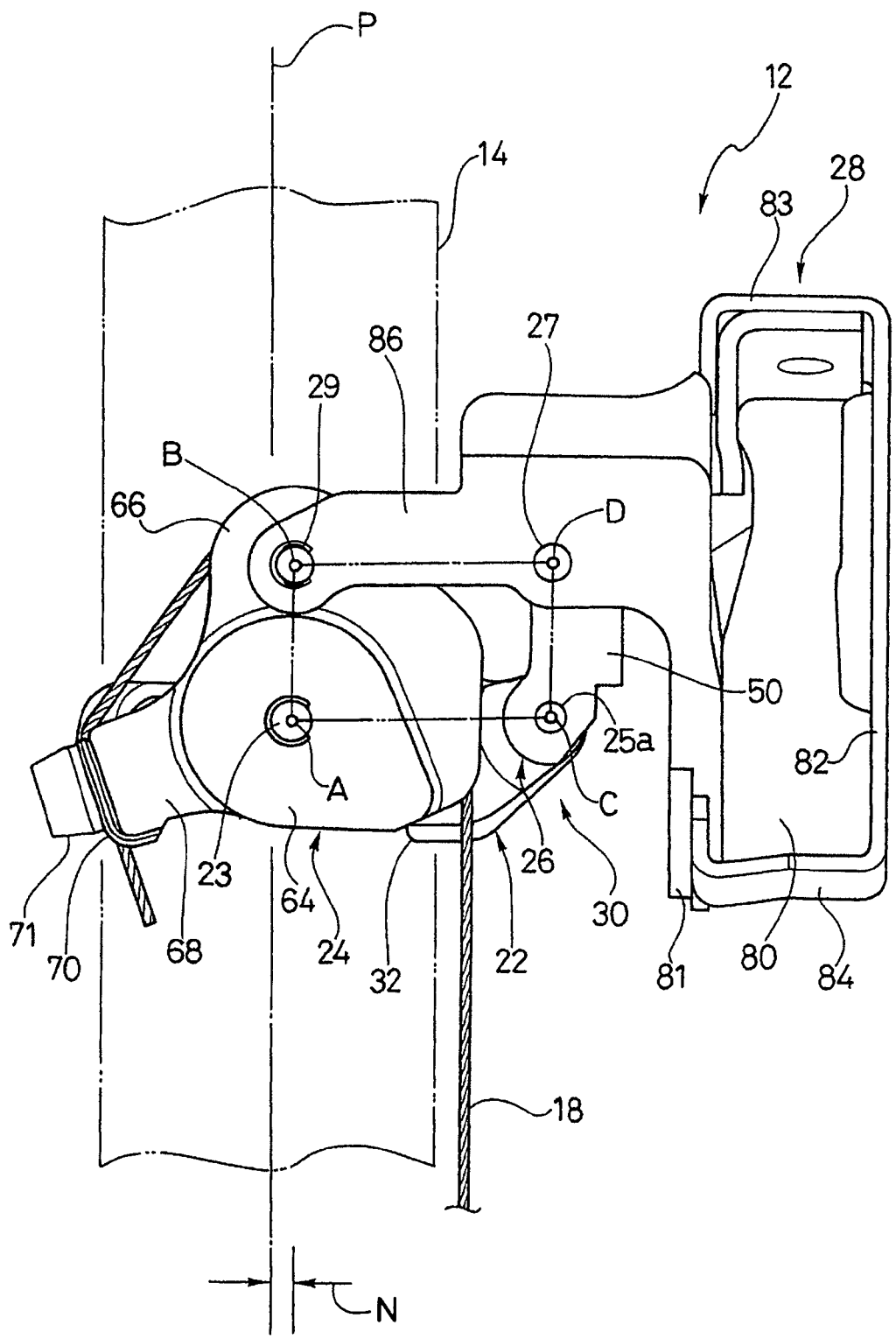
FIG. 6 is an enlarged rear elevational view of the front derailleur showing a four-bar linkage mechanism and a chain guide of the front derailleur with the chain guide in a retracted position in accordance with the first embodiment of the present invention.

The frame of the bicycle 10 extends along a longitudinal center plane P, as shown in FIG. 6. Consequently, the longitudinal center plane P extends through the center of the seat post 14. With the front derailleur 12 mounted on the seat post 14, the center axis X preferably coincides or extends through the longitudinal center plane P of the seat post 14. However, as discussed further below, the center axis X can be slightly spaced apart from the longitudinal center plane P due to manufacturing differences and seat post dimension variations bicycle to bicycle.

The front derailleur 12 is designed so that it fits a wide range of bicycle frame configurations. Specifically, the front derailleur 12 is designed so that it is suitable for use in configurations where the front derailleur 12 is operated or pulled from above by the gear shift cable 18, as shown in FIG. 2, and in configurations where the front derailleur 12 is operated from below by the gear shift cable 18, as shown in FIG. 3. In other words, the gear shift cable 18 can be linked to the cable mounting link 24 of the front derailleur 12 so that the inner cable of the gear shift cable 18 is pulled from above or below the front derailleur 12 by the gear shifter 16.

Bicycles and their various constitutive elements are well known in the art. Therefore, the following specification does not include detailed descriptions and illustrations regarding the bicycle 10 and its various constitutive elements other than the constitutive elements related to the invention. In other words, this specification describes and/or illustrates only the front derailleur 12 of the present invention and the constitutive elements related thereto.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position.

As shown in FIGS. 1, 2, 3, 6 and 7, the front derailleur 12 is installed or fixed to the seat post 14 of the bicycle 10. However, it should be understood from the drawings and description herein that the front derailleur 12 can be installed or fixed to other portions of the bicycle 10 such as the bottom bracket, as necessary or desired. In any case, it is preferable for the fixing part 22 to include a curved surface that has been configured to contact the seat post 14, as described in greater detail below.

Figure 7:
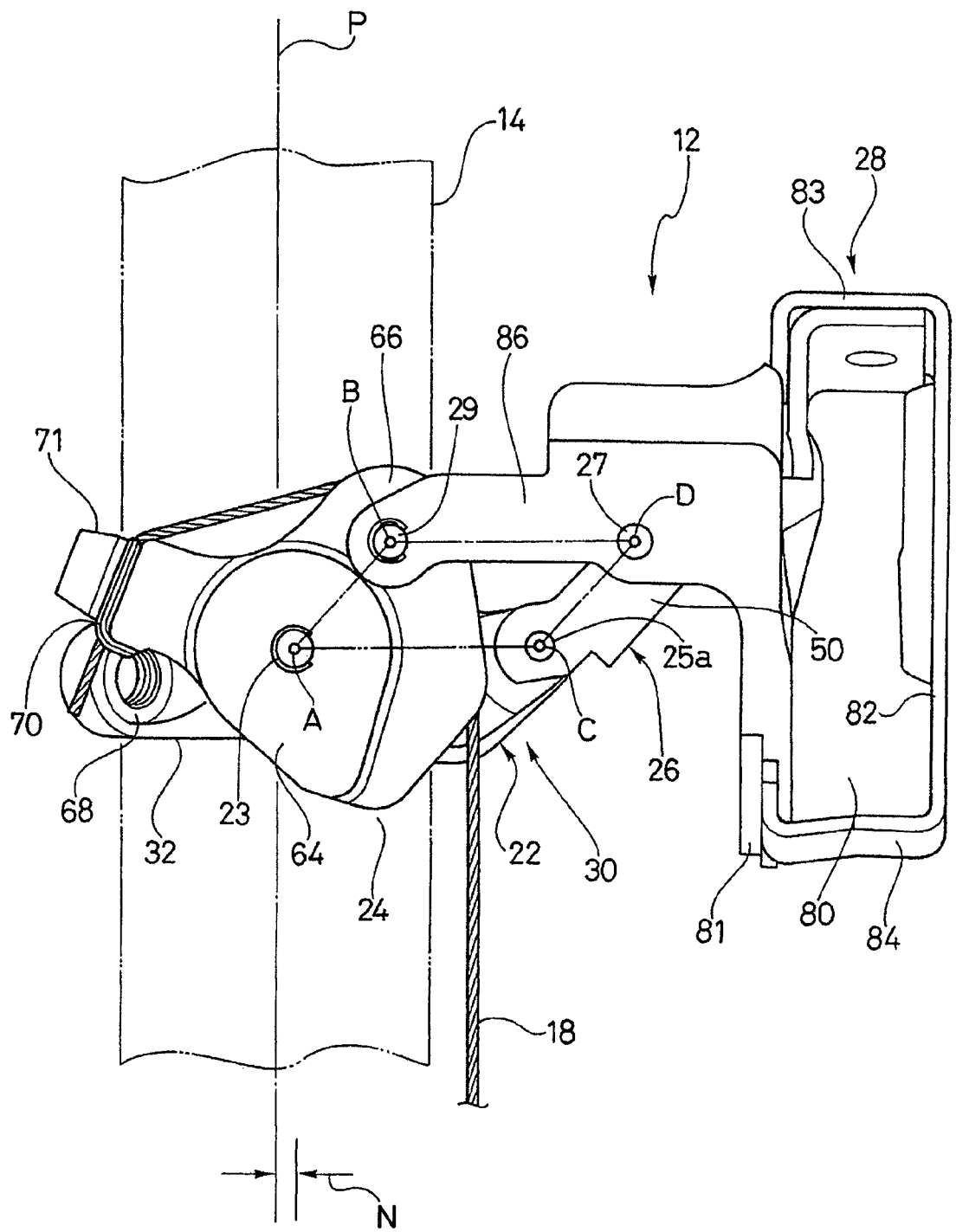
FIG. 7 is another rear elevational view of the front derailleur, similar to FIG. 6, of the four-bar linkage mechanism and the chain guide of the front derailleur with the chain guide in an extended position in accordance with the first embodiment of the present invention.

The linkage mechanism 30, as shown in FIGS. 6 and 7, is preferably a four-bar linkage mechanism that is defined by four rotational axes, the first rotational axis A, and second, third and fourth rotational axis B, C, and D. A portion of the cable mounting link 24 constitutes a first link between the first and second rotational axes A and B. A portion of the support link 26 constitutes a second link between the third and fourth rotational axes C and D. A portion of the chain guide 28 constitutes the third link between the second and fourth rotational axis B and D. A portion of the fixing member 22 constitutes a fourth link between the first and third rotational axes A and C. In this manner, the front derailleur 12 substantially includes the fixing member 22, chain guide 28, and linkage mechanism 30, thereby forming a four-bar linkage mechanism that links the fixing member 22 and the chain guide 28.

Figure 8:
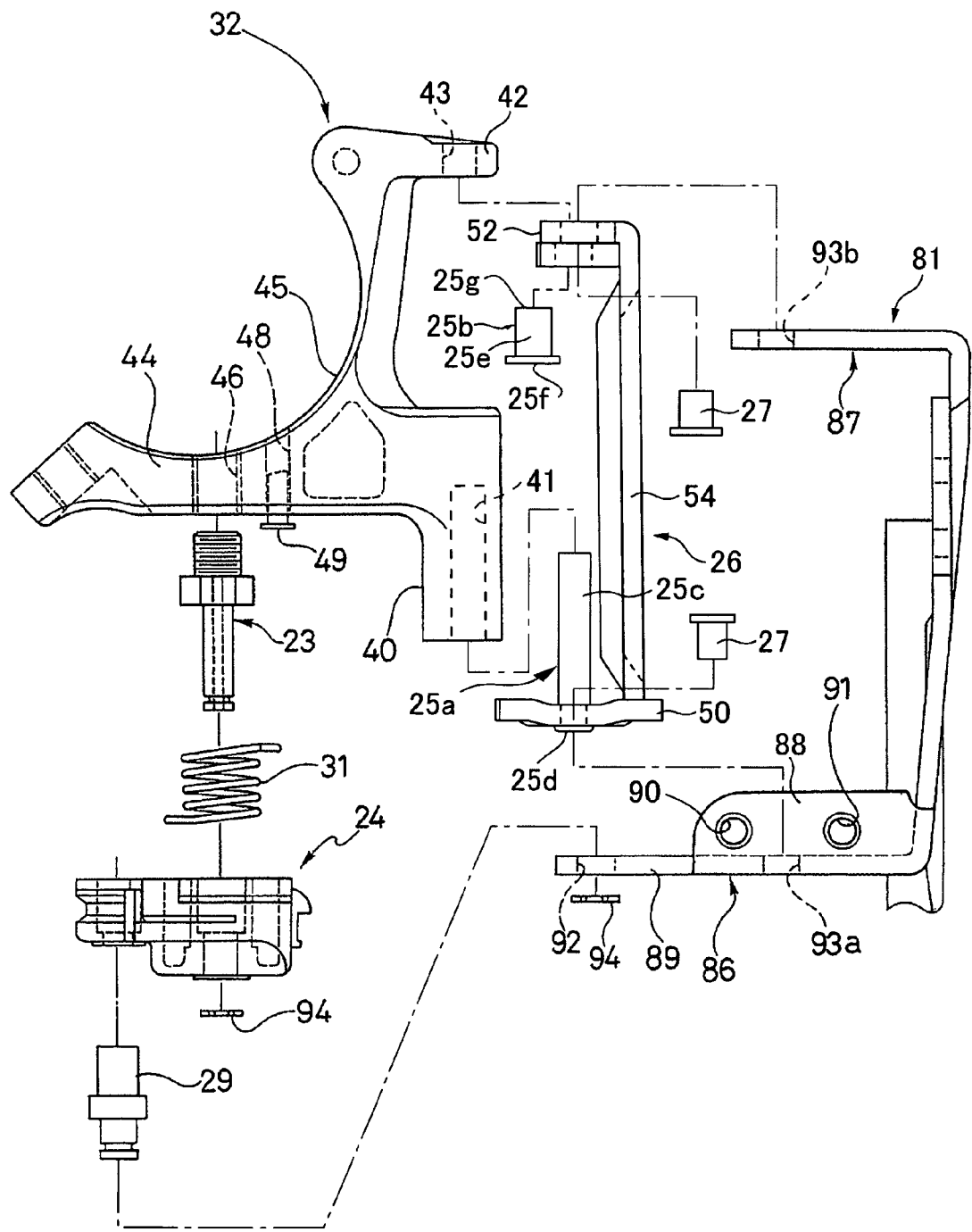
FIG. 8 is an exploded top plan view showing the various elements of the front derailleur, such as a cable mounting link (a first link), a support link (a second link), an inner guide plate (a third link) and a first clamping member (a fourth link), among other members, in accordance with the first embodiment of the present invention.

The cable mounting link 24 is rotatably supported on the fixing member 22 by a pivot pin 23. The pivot pin 23 is fixed and linked to the fixing member 22, as indicated in FIGS. 6, 7 and 8. As indicated in FIG. 8, the rotational pins 25a and 25b are installed to coincide with the third rotational axis C such that they pivotally or rotatably support one end of the support link 26 on the fixing member 22. Another end of the support link 26 rotatably supports the chain guide 28 by the pivot pins 27 that are installed to coincide with the fourth rotational axis D, as indicated in FIG. 8. The pivot pin 29 is installed in the cable mounting link 24 to coincide with the rotational axis B thereby rotatably supporting the chain guide 28 on the cable mounting link 24. By this means, the chain guide 28 is movably linked to the cable mounting link 24 and the support link 26. Hence, the chain guide 28 is movable between the retracted (low gear) position shown in FIG. 6 and extended (high gear) position shown in FIG. 7.

As shown in FIGS. 2, 3, 6, and 7, the fixing member 22 is preferably located directly under the chain guide 28 with the front derailleur 12 installed on the bicycle 10. Specifically, upper portion of the chain guide 28 connected to the support link 26 and the cable mounting link 24 is located above the fixing member 22. The linkage mechanism 30 is preferably designed so that an urging member (torsion spring) 31 always urges the chain guide 28 in a transverse direction towards the frame of the bicycle 10. In other words, when the chain guide 28 is at the retracted position (FIG. 6) the chain 19 is engaged with the chain rings of the chain ring assembly 20 that is closest to the seat post 14. When the linkage mechanism 30 moves the chain guide 28 in its extended position (FIG. 7), the chain guide 28 is positioned proximate the outermost chain ring of the chain ring assembly 20, specifically, the chain ring that is the farthest from the seat post 14.

The positioning movement of the chain guide 28 and linkage mechanism 30 is controlled by the gear shifter 16 (FIG. 1). Specifically, when the rider pulls the lever of the gear shifter 16, the gear shifter 16 pulls on the inner cable of the gear shift cable 18. As a result, the chain guide 28 moves between the retracted position (FIG. 6) and the extended position (FIG. 7) via the linkage mechanism 30. The gear shifter 16 is a conventional component, and any of various types of gear shifters may be utilized. Consequently, detailed descriptions or illustrations of the precise structure of the gear shifter 16 are not included in this specification for the sake of brevity.

As shown in FIGS. 1-3 and 6-7, the fixing member 22 is preferably directly clamped to the seat post 14. As shown in FIG. 4, the fixing member 22 basically includes a first clamp part 32, a second C-shaped clamp part 34, a pivot pin 36, and a fastener 38. Because the first and second clamp parts 32 and 34 fix the front derailleur 12 to the seat post 14 of the bicycle 10, they are made of a rigid material. The clamp parts 32 and 34 are preferably formed from metal. The clamp parts 32 and 34 can also be formed from another material, such as hard rigid plastic. Moreover, the clamp parts 32 and 34 can be formed from different materials. In the embodiment shown in the figures, the clamp parts 32 and 34 are formed by employing a production technology such as cast molding and/or machining. The clamp parts 32 and 34 can also be made from sheet metal that is bent to the prescribed shape.

The first ends of the clamp parts 32 and 34 are rotatably linked to each other by the pivot pin 36 that extends substantially vertically with respect to the bicycle 10. The other ends of the clamp parts 32 and 34 are detachably linked to each other by the fastener 38. The fastener 38 is preferably a screw or bolt that is inserted into a through-hole in the clamp member 34 and screws into a threaded hole of the first clamping member 32. Alternatively, the fastener 38 can be used together with a nut or the like.

In addition, it would be obvious to a person skilled in the art based on these disclosed details that the front derailleur 12 can be linked to another component, such as the bottom bracket of the bicycle, as necessary and/or desired. It would also be obvious to a person skilled in the art based on these disclosed details that the front derailleur 12 could be linked to the bicycle 10 using another structure without deviating from the scope of the invention. In any case, the fixing member 22 preferably contacts the seat post 14 so as to prevent longitudinal movement of the front derailleur 12. For example, the second clamp part 34 can be omitted, and the first clamp part 32 can be linked to a bottom bracket attachment part. Consequently, the term "fixing member" used in this specification includes any structure suitable for fastening to the seat post 14 and/or bicycle 10 in an immovable condition.

With reference to FIGS. 8 to 12, the first clamp part 32 is now described in greater detail. The first clamp part 32 includes a plurality of features that form a part of the linkage mechanism 30. In other words, portions of the linkage mechanism 30 are integrated together with the first clamp part 32. Specifically, the first clamp part 32 includes a pair of first and second attachment flanges 40 and 42 and a C-shaped attachment part 44. The first and second attachment flanges 40 and 42 extend outward from the C-shaped attachment part 44 and the C-shaped attachment part 44 includes a curved attachment surface 45. The attachment part 44 is rotatably linked to the second clamp part 34 via the pivot pin 36 so that the fixing member 22 is clamped to the seat post 14 by the fastener 38.

The attachment flange 40 is formed with a blind hole 41 and the attachment flange 42 is formed with a through-hole 43. The blind hole 41 and the through-hole 43 accommodate first and second pivot pins 25a and 25b (first and second pivot pin) in order to attach the support link 26 of the linkage mechanism 30. The first clamp part 32 also has a threaded screw hole 46 for receiving and retaining the pivot pin 23. Preferably, a cut-out part 47 (FIG. 9) is formed in the first clamp part 32 in order to decrease weight.

Figure 9:
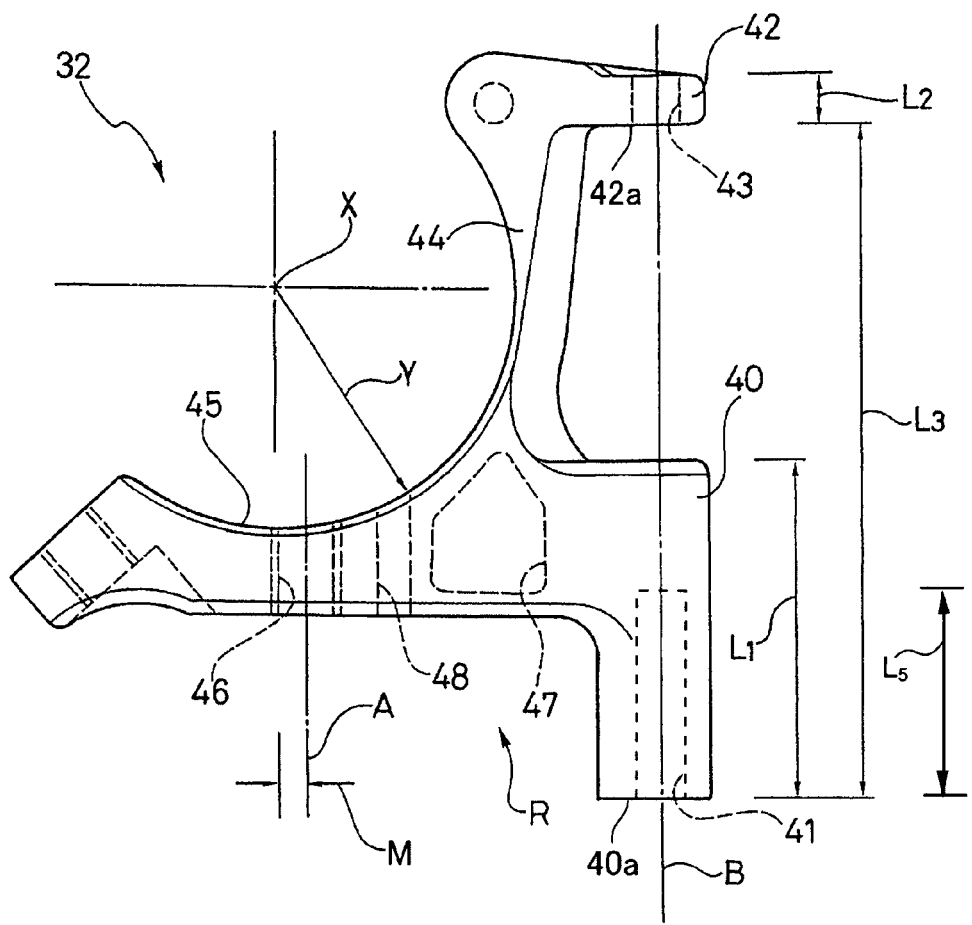
FIG. 9 is an enlarged top plan view showing the first clamping member removed from the front derailleur in accordance with the first embodiment of the present invention.
Figure 10:
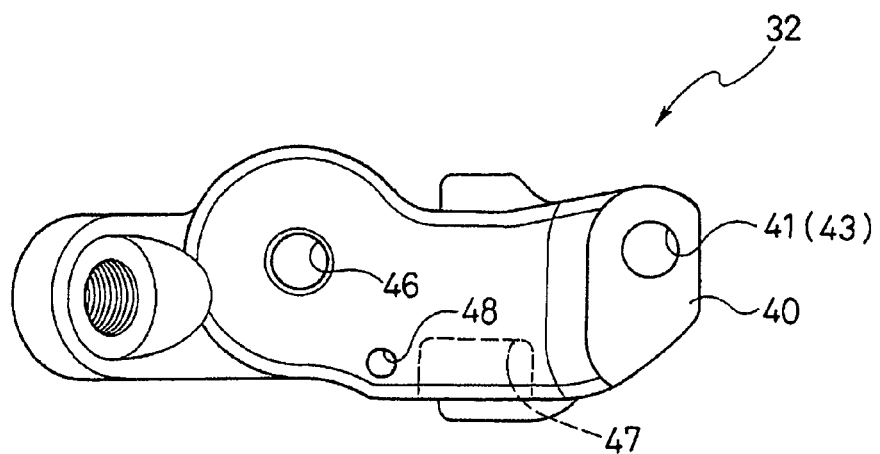
FIG. 10 is a rear elevational view of the first clamping member removed from the front derailleur in accordance with the first embodiment of the present invention.
Figure 11:
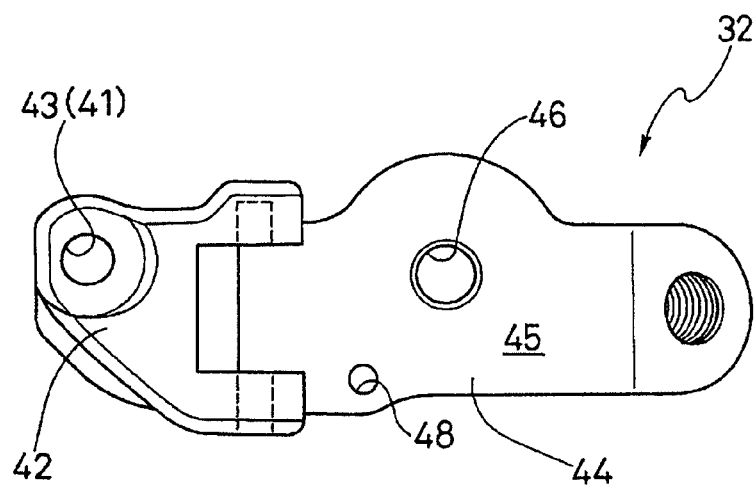
FIG. 11 is a front elevational view of the first clamp part removed from the front derailleur in accordance with the first embodiment of the present invention.
Figure 12:
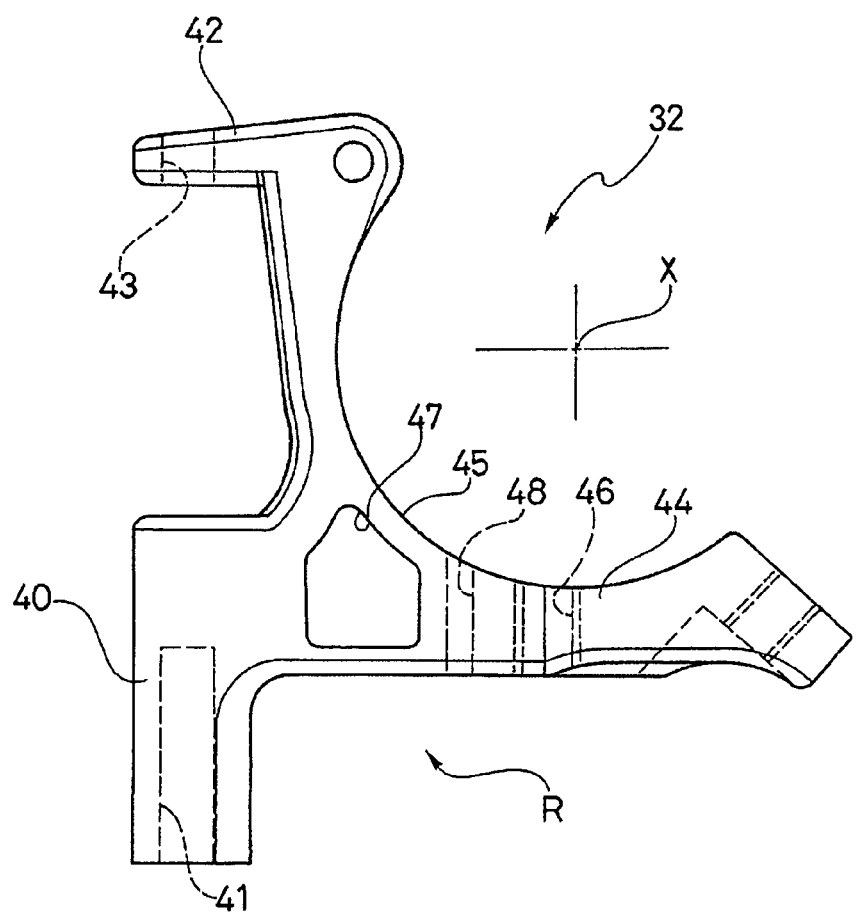
FIG. 12 is a bottom plan view of the first clamping member removed from the front derailleur in accordance with the first embodiment of the present invention.
Figure 21:
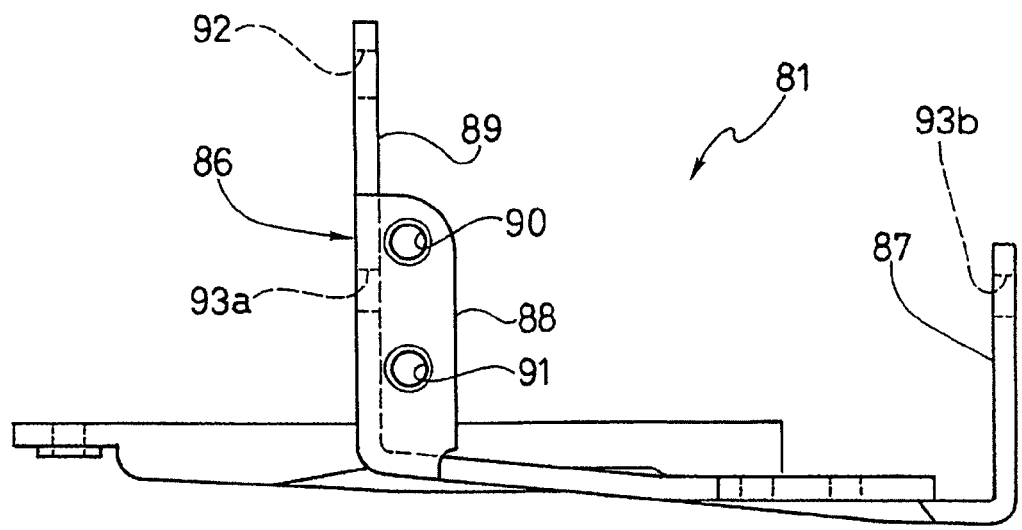
FIG. 21 is a top plan view of the inner guide plate of the chain guide removed from the front derailleur in accordance with the first embodiment of the present invention.
Figure 22:
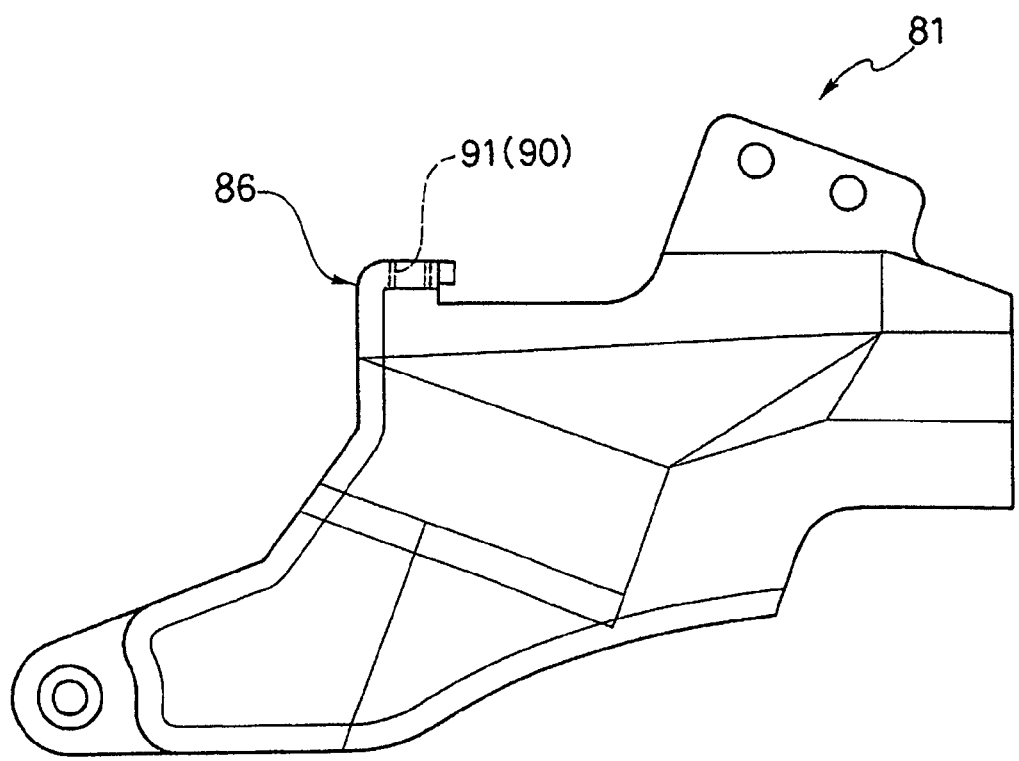
FIG. 22 is an outboard side elevational view of the inner guide plate removed from the front derailleur in accordance with the first embodiment of the present invention.
Figure 23:
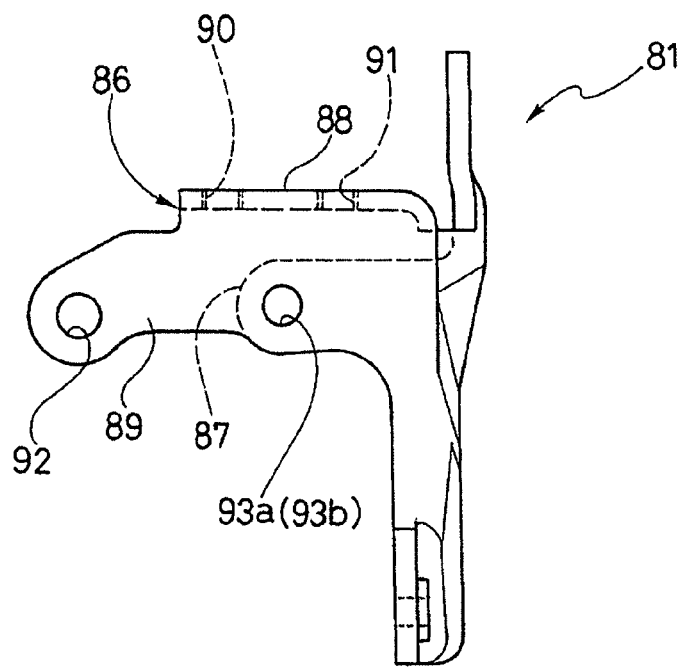
FIG. 23 is a rear elevational view of the inner guide plate removed from the front derailleur in accordance with the first embodiment of the present invention.
Figure 24:
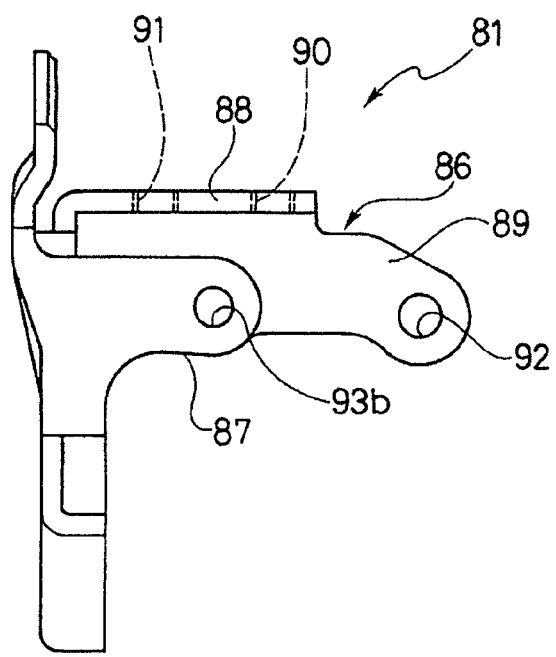
FIG. 24 is a front elevational view of the inner guide plate removed from the front derailleur in accordance with the first embodiment of the present invention.

The cable mounting link 24 is rotatably attached to the first clamp part 32 by the pivot pin 23. The pivot pin 23 is threaded into the screw hole 46 thereby coinciding with the first rotational axis A as the center. The first rotational axis A is preferably space apart from central axis X by a gap M of less than about 5.0 mm, as indicated in FIGS. 4 and 9. An additional attachment hole 48 is formed in the first clamp part 32. As indicated in FIG. 8, a stop pin 49 is installed in the attachment hole 48 such that a portion thereof protrudes from the attachment hole 48. The stop pin 49 is fixedly attached to the first clamp part 32 such that the protruding portion of the stop pin 49 engages a portion of the urging member (torsion spring) 31.

The blind hole 41 and through-hole 43 are co-axially formed to coincide with the second rotational axis B. The blind hole 41 has a length of at least $L_5$ as shown in FIG. 9. As described in greater detail below, portions of the support link 26 are rotatably linked to the fixing member 22 so that rotation occurs about the second rotational axis B. The rotational axis B is preferably substantially parallel with the rotational axis A. The first and second attachment flanges 40 and 42 have different lengths in the axial direction, measured with respect to the second rotational axis B. Specifically, as shown in FIG. 9, the first attachment flange 40 has a length $L_1$ in the axial direction, and the second attachment flange 42 has a length $L_2$ in the axial direction that is shorter than $L_1$. In additional detail, the length $L_1$ in the axial direction is preferably about 24.8 mm, and the length $L_2$ in the axial direction is preferably about 3.6 mm. In any case, it is preferable for the length $L_1$ in the axial direction to be at least about 5 times greater than the length $L_2$ in the axial direction, and for the length $L_1$ in the axial direction to be at least about 21.0 mm.

As shown in FIG. 9, the first attachment flange 40 extends in an axial direction along the second rotational axis B from the attachment part 44 of the fixing member 22. The first attachment flange 40 and the attachment part 44 form a first link-accommodating recess R between the attachment flange 40 and the attachment part 44. The first link-accommodating recess R is dimensioned such that the cable mounting link 24 is at least partially disposed therein, as indicated in FIG. 8. Accordingly, the first link-accommodating recess R is preferably at least partially in parallel alignment with the attachment flange 42 in a direction generally perpendicular to the first and second rotational axes A and B. Consequently, when the front derailleur 12 is assembled, the cable mounting link 24 is preferably at least partially aligned with the first attachment flange 40.

As shown in FIG. 9, a radius of curvature Y is defined by the curved attachment surface 45 of the attachment part 44. The radius of curvature Y is preferably about 34.9 mm, with the center axis X as its center. Thus, if the curvature of the seat post 14 is substantially similar to that of the attachment surface 45, the center axis X will coincide with the center plane P of the seat post 14. When positioned in this manner, the rotational axis A is preferably positioned so that there is a gap of about 2.0 mm from the center axis X and a gap of about 2.0 mm from the center plane P in the direction perpendicular to the rotational axis A.

It would be obvious to a person skilled in the art based on these disclosed details that the curvature of the attachment surface 45 can be increased. In addition, it would be obvious to a person skilled in the art based on these disclosed details that the shape or constitution of the attachment surface 45 can be changed in accordance with the frame structure of the bicycle 10, as necessary and/or desired. Finally, it would be obvious to a person skilled in the art based upon these disclosed details that, depending on the constitution of the seat post 14, the rotational axis A could be closer to the center axis X of the attachment surface 45 or farther from the center axis X (specifically, the gap M could be increased to greater than 2.0 mm).

In any case, the dimensions and constitution of the attachment surface 45 are determined so that the center plane P is disposed with a gap N of less than about 5.0 mm from the rotational axis A, as shown in FIGS. 6 and 7. In addition, the rotational axis A is preferably disposed with respect to the center axis X so that the rotational axis A is disposed with a gap of less than about 5.0 mm from the center surface P. In other words, in the embodiment shown in the figures, the gaps M and N are equal to each other and are about 2.0 mm. However, it would be obvious to a person skilled in the art based on these disclosed details that M and N can have different values, as necessary and/or desired. However, the gap M is preferably less than about 5.0 mm.

In the embodiment shown in FIG. 9, a distance $L_3$ measured between the corresponding axially facing end surfaces 40a and 42a of the attachment flanges 40 and 42, respectively. The distance $L_3$ is preferably, for example, about 49.2 mm. In any case, the distance $L_3$ is preferably at least about 45.0 mm. The corresponding axially facing end surfaces 40a and 42a are configured so that the support link 26 is attached thereto, as described in greater detail below. Because the axially facing end surfaces 40a and 42a of the attachment flanges 40 and 42 are spaced apart by the distance $L_3$, a wide support structure is provided for the support link 26.

With specific reference to FIGS. 2 to 8 and FIGS. 13 to 16, the support link 26 is now described in greater detail. The support link 26 basically includes (first and second) link plates 50 and 52, with a support part 54 extending therebetween. The support link 26 is preferably made from a hard rigid material. For example, the support link 26 is preferably made from a metal such as rigid sheet metal that is bent to the prescribed shape shown in the drawings. The link plates 50 and 52 extend in directions that are substantially parallel to one another. As best shown in FIG. 14, the link plate 50 has a first support part 51a and a second support part 51b, and the link plate 52 has a first support part 53a and a second support part 53b.

In reference to FIGS. 8, 13, and 14, the first pivot pin 25a includes a shaft portion 25c and a flared or enlarged end 25d. The first pivot pin 25a is fixed in place on the first support part 51a via the enlarged end 25d. As such, enlarged end 25d of the first pivot pin 25a is flared and fixed to the outer surface of the first support part 51a. Alternatively, the shaft portion 25c can be press fitted into an aperture formed in the first support part 51a, thereby fixing the pivot pin 25a in the first support part 51a. Further, the first pivot pin 25a can be welded or otherwise bonded in place. Consequently, the first pivot pin 25a is retained at just one end thereof to the first support part 51a of the link plate 50. The first support part 51a is rotatably supported on (or linked to) the attachment flange 40 via the first pivot pin 25a. An exposed portion of the shaft portion 25c of the first pivot pin 25a has a length $L_6$ as shown in FIG. 14. It should be understood from the drawings and the description herein, that the enlarged end 25d of the first pivot pin 25a has an axial surface or face that engages or contacts the first support part 51a for restraining axial movement of the first pivot pin 25a along the second rotational axis B relative to the first support part 51a.

The second support part 53a is rotatably linked to the attachment flange 42 via the second pivot pin 25b. As shown in FIG. 8, the second pivot pin 25b includes a shaft portion 25e, a head portion 25f and a distal end 25g. The first support parts 51a and 53a have respective holes 55a and 57a that accommodate the first and second pivot pins 25a and 25b. The shaft portion 25c of the first pivot pin 25a is inserted into the hole 55a and is flared and fixed in place at the outer surface of the first support part 51a.

The second pivot pin 25b is installed from an inboard side of the attachment flange 42 into the hole 57a. Thereafter, the distal end 25g of the second pivot pin 25b is deformed, thereby fixing both ends of the second pivot pin 25b in place. By this means, the support link 26 is rotatably linked to the first clamping part 32 of the fixing member 22. The second support parts 51b and 53b are formed with holes 55b and 57b, respectively, that accommodate two pivot pins 27. The chain guide 28 is rotatably supported by the two pivot pins 27. The two pivot pins 27 are also flanged pins that have a widened portion or head formed at one end thereof. The pivot pins 27 are respectively inserted from an inboard side into the holes 55b and 57b of the second support parts 51b and 53b. Thereafter, the distal ends of the pivot pins 27 are flared or deformed, such that the heads at one end and the flare at the distal end fixes each of the pivot pins 27 in place. Hence, both ends of the pivot pins 27 are fixed or retained in place.

It should be understood from the drawings and the description herein, that the head portion 25f of the second pivot pin 25b has an axial surface or face that engages or contacts the first support part 53a for restraining axial movement of the second pivot pin 25b along the second rotational axis B relative to the first support part 55a.

As shown in FIG. 14, the first support parts 51a and 53a are formed with respective axial surfaces 51c and 53c that are separated from each other by a distance $L_4$. The length of the distance $L_4$ is preferably about 49.2 mm so that a wide broad support part is provided for the chain guide 28. In any case, the dimension of the support link in the lengthwise direction (specifically, the distance $L_4$) is preferably at least about 45.0 mm, measured along the rotational axis B. It should be understood from the drawings and the description herein that the distance $L_4$ and the distance $L_3$ are preferably about the same or equal.

The corresponding axially facing surfaces 51c and 53c of the first support parts 51a and 53a are respectively disposed adjacent to the axially facing end surfaces 40a and 42a of the attachment flanges 40 and 42 when the front derailleur 12 is assembled. As shown in FIG. 14, the first support part 53a is preferably offset from the second support part 53b. However, the first and second support parts 51a and 51b are substantially parallel to one another.

As shown in FIGS. 13 to 16, the support link 26 is also provided with a bulging or protruding section 56 (specifically, a non-constant cross-sectional shape) in order to increase the strength and rigidity of the support link 26.

As indicated in FIG. 8, during assembly the support link 26 is first mounted on the attachment flanges 40 and 42 by initially inserting the distal end of the shaft portion 25c of the first pivot pin 25a into the blind hole 41, thereby mounting the support link 26 on the attachment flange 40. When this is done, the surface 53c of the link plate 52 is disposed adjacent to the surface 42a of the attachment flange 42. In this state, the second pivot pin 25b is inserted into the hole 57a of the second support part 53a and further into the through-hole 43 of the attachment flange 42. A portion of the distal end 25g of the second pivot pin 25b protrudes out of the hole 57a. The protruding portion of the distal end 25g of the second pivot pin 25b is then deformed or flared into engagement with adjacent portions of the outer surface of the attachment flange 42. Consequently, both ends of the second pivot pin 25b are retained in place. By this means, the support link 26 is attached to the first clamp part 32.

At this point, the first pivot pin 25a is retained at only one end thereof. Therefore, the first pivot pin 25a is only held in place by engagement with the retaining link 26. For this reason, if a flanged pin is used as the second pivot pin 25b when the support link 26 is mounted on the attachment flanges 40 and 42, it is only necessary for the distal end of the second pivot pin 25b to be retained by flaring or deforming, or fixing in place by installing a locking ring, so that both ends of the second pivot pin 25b are retained together with the attachment flange 42. As a result, the number of assembly steps can be reduced, and assembly of the support link 26 is facilitated.

It should be understood from the drawings and description herein that the length $L_5$ of the blind hole 41 is greater than the length $L_6$ of the shaft portion 25c of the first pivot pin 25a. Therefore, the shaft portion 25c of the first pivot pin 25a is free to pivot within the blind hole 41. Further, the first pivot pin 25a is only attached at one end. Specifically, the first pivot pin 25a is only fixed to the first support part 51a of the link plate 50.

In addition, because the first pivot pin 25a does not pass completely through the first attachment flange 40, the length of the first pivot pin 25a can be shorter than if it were made to pass therethrough. Also, the frictional resistance at the contacting surfaces can be decreased, the cutting time for the blind hole 41 can be reduced, and costs can be decreased.

It is also acceptable to provide a through-hole in the attachment flange 40 and a blind hole in the attachment flange 42. In this case, the first pivot pin 25a can be fixed in advance on the support link 26, and the second pivot pin 25b can be mounted from an inboard area of the attachment flange and flared and fixed in place.

As shown in FIGS. 14, 15 and 16, a fan-shaped member 58 is formed on the second support part 51b of the link plate 50. The fan-shaped member 58 is configured to engages adjustment screws 62 and 63 (FIGS. 2, 3 and 4) of an attachment flange 86, described in greater detail below. The fan-shaped member 58 is provided on the second support part 51b in order to provide a stopping surface for adjusting the stopping points of movement of the chain guide 28 between the retracted position and the extended position. Specifically, as shown in FIGS. 15 and 16, the fan-shaped member 58 is formed with a low-speed stop surface 60 and a high-speed stop surface 59. The high-speed stop surface 59 is designed so that it engages the free end of the high-speed adjustment screw 62, and the low-speed stop surface 60 is positioned so that it engages the low-speed adjustment screw 63. This adjustment mechanism is relatively conventional and well-known in the art, and therefore a detailed description and illustrations thereof are omitted for the sake of brevity.

With reference to FIGS. 2 thru 8 and FIGS. 17 thru 20, the cable mounting link 24 basically includes an attachment part 64, a link part 66, and a cable latching part 68. The cable mounting link 24 is preferably formed from a hard rigid material. For example, the cable mounting link 24 is preferably produced using a production technology such as casting and/or machining. The attachment part 64 is formed with a rotational hole 65 and the link part 66 is formed with a rotational hole 67. The rotational hole 65 is configured to correspond to the axis A point about which the cable mounting link 24 pivots. The rotational hole 67 defines the link attachment part corresponding to the axis B. The cable latching part 68 has a female threaded hole 69 that receives a fastener 71 (FIGS. 2, 3, 6 and 7). The fastener 71 retains a cable clamp 70. The fastener 71 is preferably a threaded screw or bolt that can be tightened to engage the cable clamp 70.

The cable clamp 70 is preferably a substantially L-shaped plate member that is urged by tightening the fastener 71 to hold the inner cable of the cable 18 on the cable mounting link 24. A groove 72 (FIGS. 17-20) is formed in the cable mounting link 24. The groove 72 provides surfaces that retain the inner cable of the cable 18 guiding it from the clamp 70, around the cable mounting link 24 from the front derailleur 12 (FIG. 3). Alternatively, the inner cable of the cable 18 can be positioned such that the groove 72 is not utilized. Specifically, as shown in FIG. 2, the cable 18 extends upwards along the seat post 14.

The attachment part 64 of the cable mounting link 24 is pivotally supported on the pivot pin 23 so that rotation or pivoting movement occurs about the rotational axis A. The link part 66 rotatably supports the chain guide 28 via the pivot pin 29. The inner cable of the cable 18 is pulled via the gear shifter 16, and the cable mounting link 24 rotates about the rotational axis A. By this means, the link part 66 also rotates about the rotational axis A, and the chain guide 28 is moved via the pivot pin 29. The attachment part 64, as shown in FIG. 19, includes a ring-shaped depression 74 with an extended notch 75. The notch 75 is designed to engage one end of the urging member 31.

As shown in FIGS. 2 to 8 and FIGS. 21 to 24, the chain guide 28 is preferably made from a hard rigid material. For example, the chain guide 28 is preferably made from a metal such as a rigid sheet metal that can be bent to the depicted shape. As shown in FIG. 4, the chain guide 28 defines a chain-accommodating slot 80 formed from a pair of perpendicular shift plates 81 and 82 that are suitable for engaging the chain 19 in order to move the chain 19 transversely with respect to the bicycle 10. The shift plate 81 is depicted in FIGS. 21 thru 24 and described in greater detail below. The shift plate 82 is shown mainly in FIGS. 2 thru 7, but is omitted from FIG. 8. The shift plate 82 is formed with plate portions 83 and 84. The shift plates 81 and 82 (specifically, the inner and outer shift plates) are linked together by the plate portions 83 and 84. Specifically, the plate portion 83 is attached to an upper end of the shift plate 81 by screws 85 (see FIGS. 2 and 3). The plate portion 84 is attached to with a lower end of the shift plate 81 in a conventional manner, for instance by a fastener, such as a rivet or screw.

The shift plate 81 is now described with specific reference to FIGS. 21 thru 24. The shift plate 81 is formed with a pair of attachment flanges 86 and 87 that extend substantially perpendicularly from the shift plate 81 and parallel to one another. The attachment flanges 86 and 87 are coupled to the linkage mechanism 30 in a manner described below. Specifically, a portion of the attachment flange 86 forms one of the third links of the linkage mechanism 30. The attachment flange 86 has a substantially horizontal part 88 and a substantially vertical part 89 that is substantially perpendicular to the horizontal part 88 and the main portion of the shift plate 81 and the shift plate 82. The vertical part 89 preferably has a pair of surfaces that are substantially flat. The horizontal part 88 has a pair of screw holes 90 and 91 that respectively accommodate the adjustment screws 62 and 63. The adjustment screw 62 is a high-speed position adjustment screw, and the adjustment screw 63 is a low-speed position adjustment screw. The adjustment screws 62 and 63 selectively engage the fan-shaped member 58 of the support link 26 and control the range of movement of the chain guide 28 in a conventional manner. In other words, by adjusting the amount of position of the adjustment screws 62 and 63 in the axial direction with respect to the horizontal part 88, the retracted position (low gear) and the extended (high gear) position of the chain guide 28 can be independently adjusted.

The vertical part 89 of the attachment part 86 has a pair of rotational holes 92 and 93a for rotatably attaching the plurality of parts of the linkage mechanism 30. The attachment flange 87 is formed with a rotational hole 93b on the same axis as the rotational hole 93a of the vertical part 89 for rotatably linking the plurality of parts of the linkage mechanism 30 therebetween. Specifically, the rotational hole 92 rotatably accommodates the pivot pin 29 (linked to the cable mounting link 24), and the rotational holes 93a and 93b rotatably accommodate the pivot pins 27. Accordingly, the chain guide 28 is movably linked to the cable mounting link 24 and the support link 26, respectively, by pivot pin 29 and pivot pin 27.

As shown in FIGS. 2, 3 and 8, the pivot pins 25b, and 27 are flanged pins, and the ends are flared and fixed in place. In addition, the pivot pin 29 is formed with a groove that receives a locking ring 94. This locking ring 94 is preferably an E-shaped locking ring that fits into the retaining groove of the pivot pin. Bushings (not shown) can be installed in any group of or all of the holes, 41, 43, 57a, 57b, 65, 67, 92, 93a and/or 93b, and can be jointly used on the pivot pins 23, 25a, 25b, 27 and 29 as desired. It would be obvious to a person skilled in the art, based on the disclosed details, that any suitable pivot pin may be jointly used in the present invention. For example, any pivot pin that is retained by a locking ring may be used. For example, the pivot pin 25a can be retained and fixed to the first support part 51a of the link plate 50 by a locking pin, without flaring and fixing in place.

The urging member 31 is preferably a torsion spring that has a coiled part and is disposed around the periphery of the pivot pin 23. The urging member 31 continuously urges the chain guide 28 from its extended position towards its retracted position. Therefore, the first end of the member is disposed in the notch 75 of the cable mounting link 24 (FIGS. 8 and 19), and the second end of the member engages the stop pin 49 of the fixing member 22 (FIGS. 4 and 8). In other words, the urging member, specifically, the torsion spring 31, is disposed in a continually compressed condition so that it urges the cable guide 28 from its extended position towards its retracted position. Movement of the chain guide 28 is controlled by the gear shifter 16 that moves the gear shift cable 18 by a conventional method.

Second Embodiment

Figure 25:
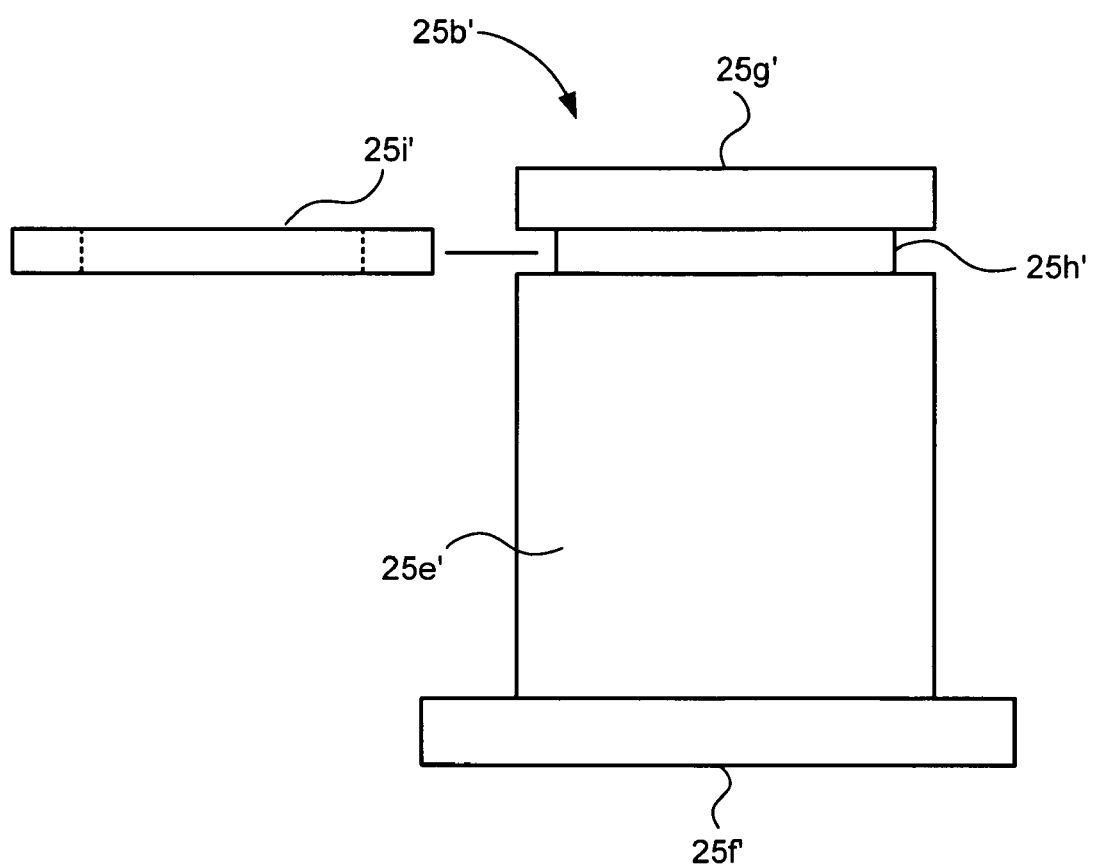
FIG. 25 is a top plan view of a pivot pin in accordance with a second embodiment of the present invention.

Referring now to FIG. 25, a second pivot pin 25b' in accordance with a second embodiment will now be explained. Basically, the second pivot pin 25b' is used in the front derailleur 12 by replacing the pivot pin 25b of the first embodiment with the second pivot pin 25b'. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

FIG. 25 shows the second pivot pin 25b' that replaces the pivot pin 25b of the first embodiment shown in FIG. 8. Specifically, the second pivot pin 25b' includes a shaft portion 25e', a head portion 25f, a distal end 25g' and a groove 25h'. The groove 25h' is configured to receive a ring clip 25i'. The second pivot pin 25b' is installed in the support link 26 and the first clamping part 32 in much the same way as the second pivot pin 25b of the first embodiment. However, in the second embodiment, the ring clip 25i' is installed in the groove 25h' in order to hold the distal end of the second pivot pin 25b in position. Consequently, the support link 26 is rotatably linked to the first clamping part 32 of the fixing member 22 by the second pivot pin 25b' without flaring or deformation.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle front derailleur comprising:
a fixing member configured to be attached to a bicycle frame, the fixing member including a first attachment flange and a second attachment flange axially aligned with one another, the second attachment flange being spaced apart in an axial direction from the first attachment flange;
a chain guide coupled to the fixing member to move between a retracted position and an extended position in a transverse direction relative to fixing member and the bicycle frame;
a linkage mechanism coupling the chain guide to the fixing member to move the chain guide between the retracted position and the extended position, the linkage mechanism comprising
a first link pivotally coupled to the fixing member about a first rotational axis,
a second link pivotally coupled to the first and second attachment flanges by first and second pivot pins, respectively, such that rotation occurs about a second rotational axis that is substantially parallel to the first rotational axis, and
a third link pivotally coupled to both the first and second links forming a four-member linkage mechanism along with the fixing member for movement of the chain guide,
the first pivot pin having a first end fixed to the second link to substantially prevent axial movement relative to the second link, and a second end free of any mechanical retaining connection with the first attachment flange that prevents axial movement relative to the first attachment flange, and
the second end of the first pivot pin being axially arranged between oppositely facing axial end surfaces of the first attachment flange.

2. The bicycle front derailleur according to claim 1, wherein
the first end of the first pivot pin is deformed to the second link to prevent axial movement relative to the second link.

3. The bicycle front derailleur according to claim 2, wherein
the second pivot pin is deformed at one end to fixedly secure the second link to the fixing member.

4. The bicycle front derailleur according to claim 2, wherein
the second pivot pin has a locking ring at one end to fixedly secure the second link to the fixing member.

5. The bicycle front derailleur according to claim 1, wherein
the second pivot pin has a locking ring at one end to fixedly secure the second link to the fixing member.

6. The bicycle front derailleur according to claim 1, wherein
the second pivot pin is deformed at one end to fixedly secure the second link to the fixing member.

7. The bicycle front derailleur according to claim 6, wherein
the first and second attachment flanges have different axial lengths in a direction of the second rotational axis.

8. The bicycle front derailleur according to claim 7, wherein the first pivot pin has a longer axial length than the second pivot pin.

9. The bicycle front derailleur according to claim 8, wherein
the first pivot pin is disposed in a hole of the first attachment flange in which the hole is longer than the first pivot pin.

10. The bicycle front derailleur according to claim 6, wherein
the first pivot pin is disposed in a hole of the first attachment flange in which the hole is longer than the first pivot pin.

11. The bicycle front derailleur according to claim 1, wherein the first link includes a shifter cable latching portion.

12. The bicycle front derailleur according to claim 1, wherein
the linkage mechanism includes an urging member arranged to urge the chain guide towards one of the retracted position and extended position.

13. The bicycle front derailleur according to claim 1, wherein the first pivot pin has a shorter axial length than the first attachment flange.

14. A bicycle front derailleur comprising:
a fixing member configured to be attached to a bicycle frame, the fixing member including a first attachment flange and a second attachment flange axially aligned with one another, the second attachment flange being spaced apart in an axial direction from the first attachment flange;

a chain guide coupled to the fixing member to move between a retracted position and an extended position in a transverse direction relative to fixing member and the bicycle frame;

a linkage mechanism coupling the chain guide to the fixing member to move the chain guide between the retracted position and the extended position, the linkage mechanism comprising a first link pivotally coupled to the fixing member about a first rotational axis, a second link pivotally coupled to the first and second attachment flanges by first and second pivot pins, respectively, such that rotation occurs about a second rotational axis that is substantially parallel to the first rotational axis, and a third link pivotally coupled to both the first and second links forming a four-member linkage mechanism along with the fixing member for movement of the chain guide, the first pivot pin having a first end fixed to the second link to substantially prevent axial movement relative to the second link, and a second end free of any mechanical retaining connection with the first attachment flange that prevents axial movement relative to the first attachment flange, and the first and second attachment flanges having different axial lengths in a direction of the second rotational axis.

15. The bicycle front derailleur according to claim 14, wherein the first pivot pin has a longer axial length than the second pivot pin.

16. The bicycle front derailleur according to claim 15, wherein
the first pivot pin is disposed in a hole of the first attachment flange in which the hole is longer than the first pivot pin.

17. The bicycle front derailleur according to claim 16, wherein
the second pivot pin has a locking ring at one end to fixedly secure the second link to the fixing member.

18. The bicycle front derailleur according to claim 15, wherein
the second pivot pin is deformed at one end to fixedly secure the second link to the fixing member.

19. The bicycle front derailleur according to claim 18, wherein the first pivot pin has a longer axial length than the second pivot pin.

20. The bicycle front derailleur according to claim 19, wherein
the first pivot pin is disposed in a hole of the first attachment flange in which the hole is longer than the first pivot pin.

21. A bicycle front derailleur comprising:
a fixing member configured to be attached to a bicycle frame, the fixing member including a first attachment flange and a second attachment flange axially aligned with one another, the second attachment flange being spaced apart in an axial direction from the first attachment flange;

a chain guide coupled to the fixing member to move between a retracted position and an extended position in a transverse direction relative to fixing member and the bicycle frame;

a linkage mechanism coupling the chain guide to the fixing member to move the chain guide between the retracted position and the extended position, the linkage mechanism comprising a first link pivotally coupled to the fixing member about a first rotational axis, a second link pivotally coupled to the first and second attachment flanges by first and second pivot pins, respectively, such that rotation occurs about a second rotational axis that is substantially parallel to the first rotational axis, and a third link pivotally coupled to both the first and second links forming a four-member linkage mechanism along with the fixing member for movement of the chain guide, the first pivot pin having a first end fixed to the second link to substantially prevent axial movement relative to the second link, and a second end free of any mechanical retaining connection with the first attachment flange that prevents axial movement relative to the first attachment flange, and the first pivot pin being disposed in a hole of the first attachment flange in which the hole is longer than the first pivot pin.

22. The bicycle front derailleur according to claim 21, wherein
the second pivot pin is deformed at one end to fixedly secure the second link to the fixing member.

23. A link assembly method for a bicycle front derailleur comprising:
providing a fixing member with spaced apart first and second attachment portions with first and second holes that are coaxially aligned, the first hole extending between oppositely facing axial end surfaces of the first attachment portion;

providing a link having spaced apart first and second attachment flanges with a first end of a first pivot pin fixed to the first attachment flange;

inserting the first pivot pin into the first hole of the first attachment portion of the fixing member after the first pivot pin is fixed to the first attachment flange such that the link is supported on the fixing member by the first pivot pin; and securing a second pivot pin between the second attachment flange of the link and the second hole of the second attachment portion of the fixing member while leaving a second end of the first pivot pin free of any mechanical retaining connection with the first attachment portion that prevents axial movement relative to the first attachment portion, the second end of the first pivot pin being axially arranged between the oppositely facing axial end surfaces of the first attachment portion when the second pivot pin is secured to the second attachment flange and the second attachment portion.

24. The link assembly method according to claim 23, wherein
the securing of the second pivot pin between the second attachment flange of the link and the second hole of the second attachment portion of the fixing member includes deforming one end of the second pivot pin.

25. The link assembly method according to claim 23, wherein
the securing of the second pivot pin between the second attachment flange of the link and the second hole of the second attachment portion of the fixing member includes attaching a locking ring to one end of the second pivot pin.

* * * * *